March 8, 1966  J. J. SLOYAN  3,239,169
MACHINERY SUPPORT
Filed Dec. 2, 1963   3 Sheets-Sheet 1
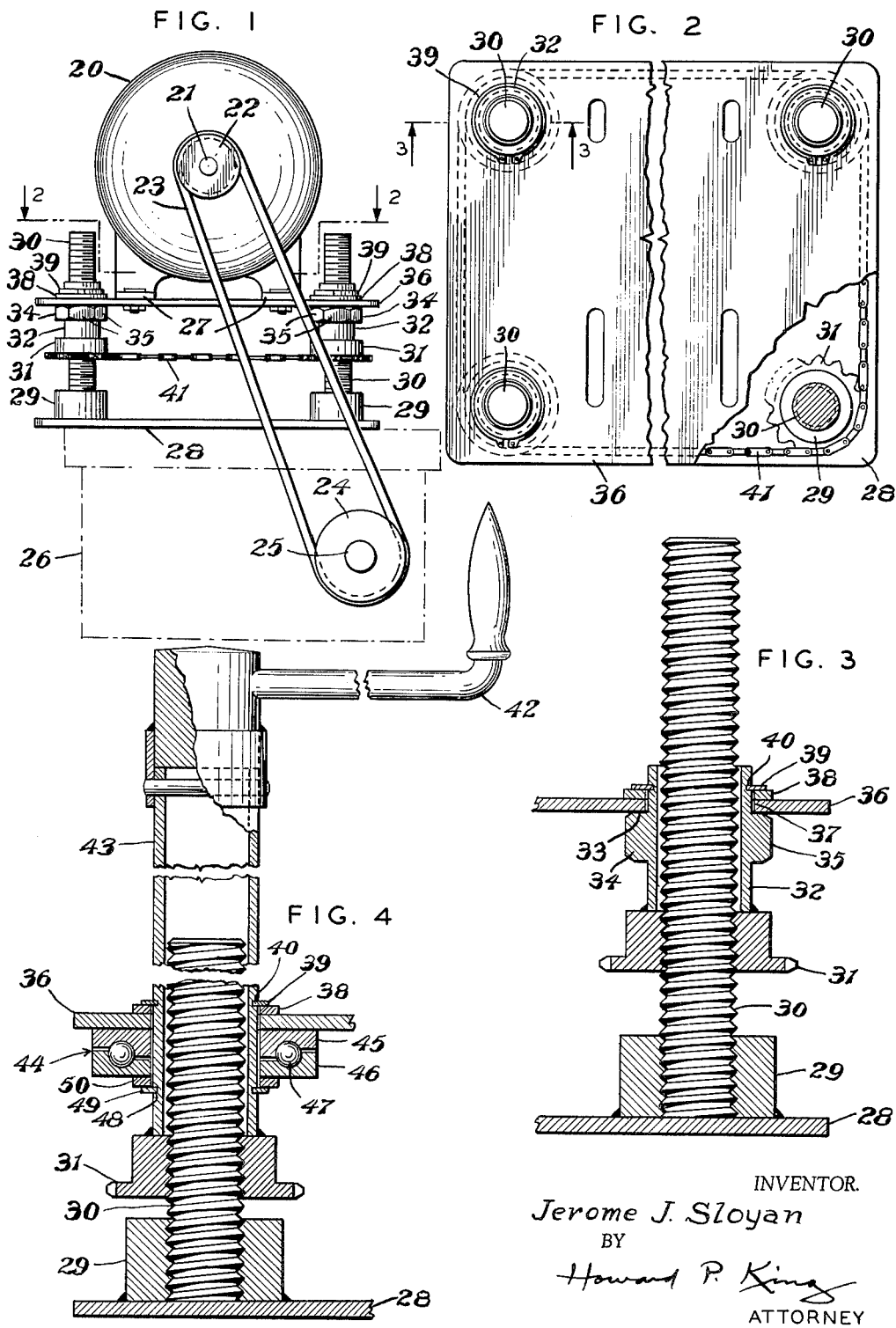
INVENTOR.
Jerome J. Sloyan
BY
Howard P. King
ATTORNEY March 8, 1966 J. J. SLOYAN 3,239,169
MACHINERY SUPPORT
Filed Dec. 2, 1963 3 Sheets-Sheet 2
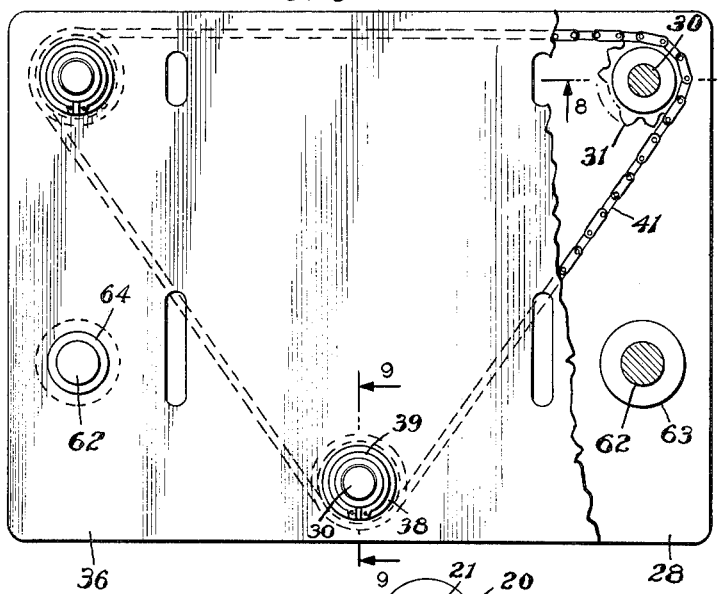
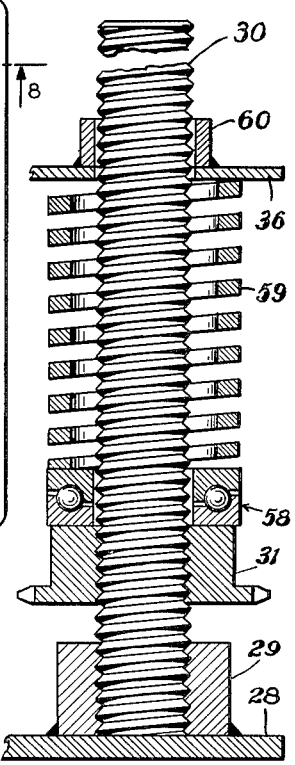
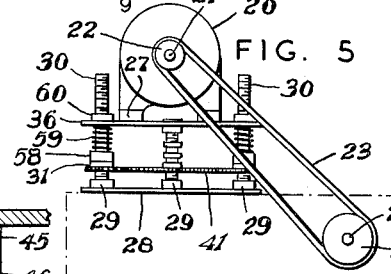
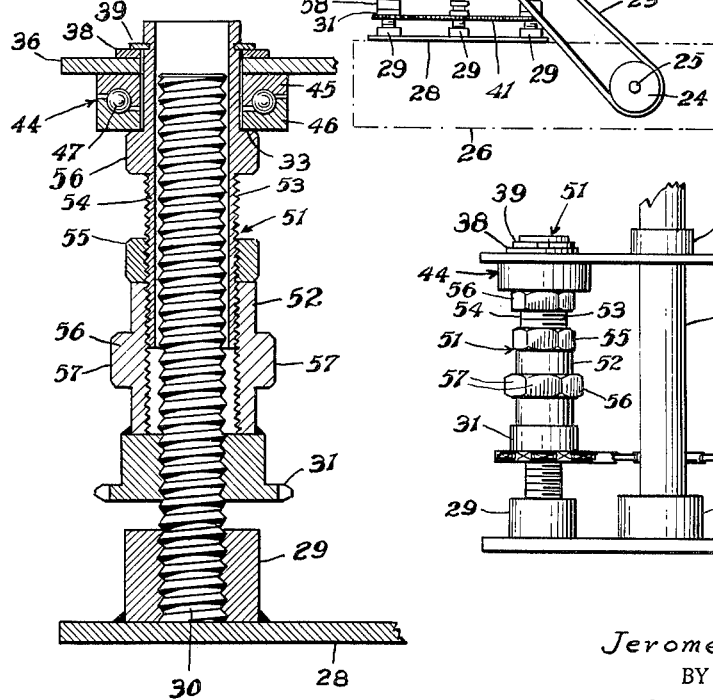
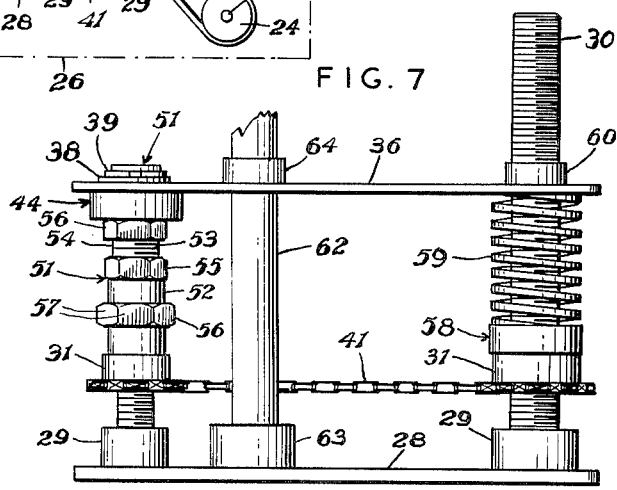
INVENTOR.
Jerome J. Sloyan
BY
Howard P. King
ATTORNEY March 8, 1966  J. J. SLOYAN  3,239,169
MACHINERY SUPPORT
Filed Dec. 2, 1963  3 Sheets-Sheet 3
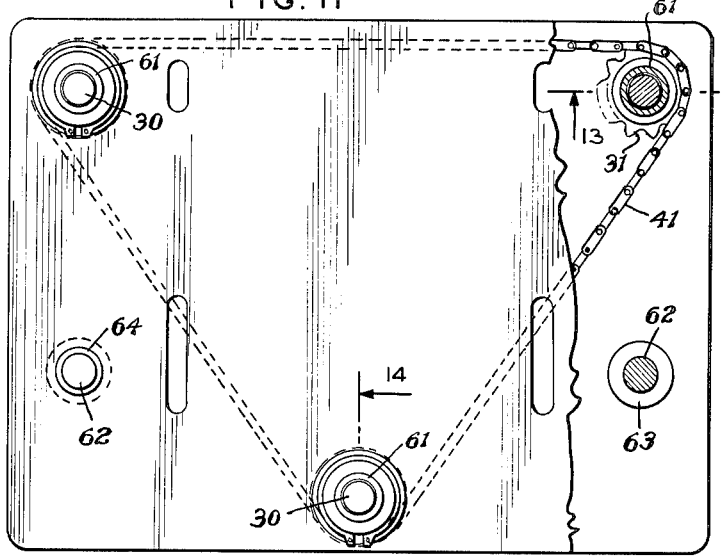
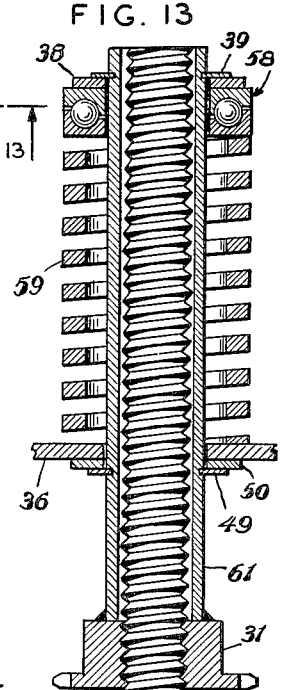
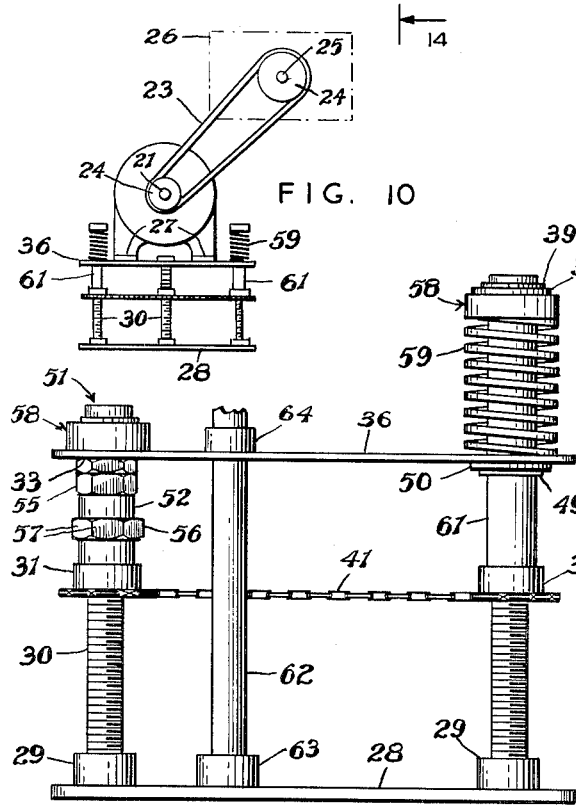
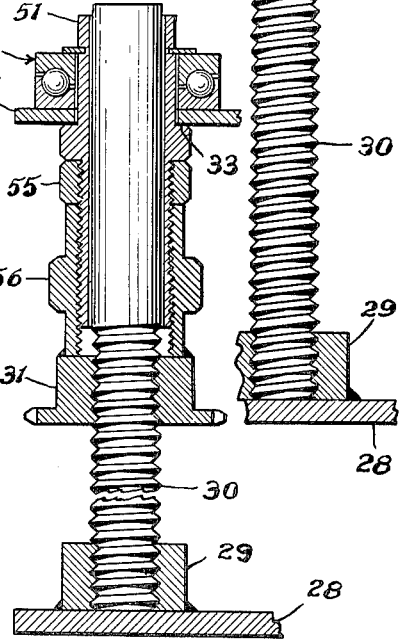
INVENTOR.
Jerome J. Sloyan
BY
Howard P. King
ATTORNEY United States Patent Office 3,239,169
Patented Mar. 8, 1966

3,239,169
MACHINERY SUPPORT
Jerome J. Sloyan, Hamilton Square, N.J.
(% Automatic Motor Base Co., Windsor, N.J.)
Filed Dec. 2, 1963, Ser. No. 327,444
3 Claims. (Cl. 248—23)

This invention relates to supports, and more particularly to supports for mounting motors in desired position of operation with respect to a mechanism to be driven by the motor.

An object of the invention is to provide an improved motor mount by which the motor may have an adjustment of position in a direction perpendicular to the plane of the motor feet.

Essential among the objects of the invention is provision of a construction permitting the aforesaid adjustment but maintaining parallelism of the successive positions of the said plane of the motor feet.

Another object of the invention is to enable the said adjustment to be made quickly and to the desired extent without disturbing alignment of the driving and driven pulleys of the motor and driven mechanism respectively.

It is a further object of the invention to provide a stable support for the motor in all positions to which it is adjusted.

The invention proposes a construction of sturdy and simple character, yet fulfilling all of the foregoing objectives.

Again it may be said that the invention is directed to a practical construction capable of compensating for driving torque between the motor and driven mechanism.

Other objects, advantages and novel features of construction will appear to persons skilled in the art to which the invention appertains as the description proceeds, both by direct recitation thereof and by implication from the context.

Referring to the accompanying drawings in which like numerals of reference indicate similar parts throughout the several views;

FIGURE 1 is an elevation, at what may be arbitrarily designated the front, of a support constructed in accordance with the invention, and showing a motor mounted thereon and a driven instrumentality diagrammatically indicated as located thereunder;

FIGURE 2 is a plan of said support, without the motor, as on line 2—2, but with one corner of the upper or movable plate broken away to show one of the sprockets and sprocket chain;

FIGURE 3 is a vertical sectional view, on enlarged scale, taken on line 3—3 of FIG. 2, showing one means for rotating the sprocket;

FIGURE 4 is a similar sectional view showing a different means for rotating the sprocket;

FIGURE 5 is an elevation, again arbitrarily referred to as front, of a modified construction of support, and corresponding to FIG. 1 in showing of motor and driven instrumentality;

FIGURE 6 is a plan of said modified construction of support, part of the upper or movable plate being broken away;

FIGURE 7 is an elevation of the support of FIG. 6, looking at the same from right to left;

FIGURE 8 is a vertical sectional view on line 8—8 of FIG. 6, showing spring support for the upper plate;

FIGURE 9 is a vertical sectional view on line 9—9 of FIG. 6 showing individual adjustment between plate and sprocket;

FIGURE 10 is a front elevation similar to FIGS. 1 and 5, showing the support in modified construction adapting it to drive an instrumentality located at a level above the motor;

FIGURE 11 is a plan of the modification of FIG. 10, without the motor mounted thereon;

FIGURE 12 is a side elevation of the support looking from right to left of FIG. 10;

FIGURE 13 is a vertical section on line 13—13 of FIG. 11; and

FIGURE 14 is a vertical section on line 14—14 of FIG. 11.

In all forms of the invention, the support constituting the same is constructed for mounting a motor 20 thereon, said motor having a drive shaft 21 and a driving pulley 22, or its equivalent, fixed on the shaft at the end thereof herein arbitrarily designated the front of the support. The motor is adapted, through agency of a belt 23 or the like, to rotate a driven pulley 24 mounted on a shaft 25 constituting part of any selected instrumentality 26 to which the actuation from the motor is desired. The two said shafts 21 and 25 are parallel to each other lying in a common plane and that plane has a sloping relation to the plane of the motor feet 27 in a range of angularity therewith of approximately 45° to 90°. The instrumentality 26 has a fixed location, whereas the support of this invention provides for bodily movement of the motor in a direction perpendicular to the plane of its feet, which thereby obtains variation in the distance existing between the motor and the level of the instrumentality. This variation of distance may be used for tightening the belt, or, where variable pitch pulleys are employed, may be used to change the speed of the driven pulley 24 and its shaft 25.

Devoting attention initially to the specific construction shown in FIGS. 1–3, the support therein illustrated provides a basal member or fixed lower plate 28 at the upper side of which, proximate to the four corners thereof, are provided hollow bosses 29 made integral with said basal member by welding or otherwise. These bosses are shown internally threaded and open upwardly and each receives and retains the lower end portion of a fixed threaded post 30. In making assembly of the said posts in the bosses, a suitable epoxy or other adhesive is applied to the interengaging threads, thereby retaining the posts nonrotatable in their respective bosses. The arrangement is such that said posts are upstanding from the basal member and are parallel to each other.

Each post 30 has a sprocket wheel 31 thereon, said sprocket wheel having a coaxial threaded bore the threads of which interengage with the threads of the post so that rotation of the sprocket wheel will obtain an axial shift in its position toward or away from the basal member or lower plate 28. Projecting upwardly from and coxial with each sprocket wheel is a sleeve 32 gridling its associated post which extends therethrough to afford a selected range of rise and depression of the sprocket wheel and sleeve on the post. The sleeve is made integral with the sprocket wheel, as by being welded thereto, and is of course coaxial to the post, but requires no internal threads and preferably has an internal smooth cylindrical surface with a diameter commensurate with the major diameter of the post threads to permit the sleeve to slide as well as rotate with respect to the crests of the post threads contiguous thereto.

Intermediate of the ends of said sleeve 32, there is an external upwardly directed shoulder 33 extending peripherally around the sleeve in a plane perpendicular to the sleeve axis. According to the showing of FIG. 3, said shoulder may conveniently be formed as the upper planar end of an external circumferential enlargement 34 on the sleeve. The periphery of said enlargement is provided with wrench-receiving means, here shown as a series of facets 35 around the enlargement comparative to a hexagonal nut arrangement. The shoulder 33 constitutes means for supporting a movable or upper plate 36 by the sleeve, with the movement of the plate determined by the axial movement of the sprocket wheel 31 on its post 30. Said plate has a circular hole 37 through which the sleeve projects. Resting on the top of the plate is a washer 38 situated around the sleeve where protruding through said hole, and above the washer is a snap ring 39 seated at its internal periphery in a prepared groove 40 in the outer surface of the sleeve, and so related to the shoulder 33 as to confine the plate from upward displacement from the shoulder.

An endless taut sprocket chain 41 circumambient to the plurality of sprocket wheels constitutes a means for rotating all of said sprocket wheels simultaneously and in the same direction of rotation. Thus, a wrench applied to the wrench-receiving means 35 of any one sprocket wheel 31 obtains rotation of that sprocket wheel and produces a like rotation of the other sprocket wheels through agency of the circumambient sprocket chain 41. Consequently, the movable plate 36 will be raised or lowered by the action of all of the sleeves 32 functioning correspondingly and simultaneously and the shifted position of the movable plate will remain parallel to the position from which it was moved. In making the original assembly, the sprocket wheels 31 are initially set to the desired position of support for the movable plate 36, usually with the movable plate parallel to the fixed or basal plate 28. The chain 41 is then applied to the sprocket wheels 31, and henceforth the movable plate 36 will be moved into shifted positions always parallel to the initially set position. The motor 20 is mounted on the movable plate 36, and its shaft 21 will thereby always be in parallelism to the shaft 25 of the instrumentality 26 being operated by the motor.

The invention as exemplified by the structure disclosed thus provides means for adjusting the position of a rotor to effect a tension in the driving belt in those applications where a line drawn between the center of the motor shaft and driven shaft passes through the plane of the motor feet, or such line, if extended, would pass through said plane. For most effective utilization of the invention, such imaginary line should make an angle of 45° or more with the said plane of the motor feet. It may be pointed out at this time, that while the present description refers to directions of up and down, agreeable to the arbitrary location of parts shown in the drawing wherein the fixed basal member or plate is in a horizontal position, it is to be understood that the support may be used in various positions, such as with the basal member arranged vertically for side wall mounting, in which event, of course, the several posts would assume horizontal positions, there being no alteration in the structure, but only in position of use of the support as a unit.

Other means than the nut-like enlargement 34 for rotating the sprocket wheel on its fixed threaded post may be employed, and as one alternative, a crank 42 is shown in FIG. 4. According to this showing, basal member or lower plate 28, hollow threaded bosses 29, threaded post 30 fixed in the boss, sprocket wheel 31 in threaded engagement with the post, taut sprocket chain 41 and movable upper member or plate 36 with its hole 37, conform to the description thereof given hereinabove. In this instance, a sleeve 43 is provided that is longer than sleeve 32 used in the previously described construction, it being long enough to project beyond the upper end of the post 30 and far enough so that crank 42 secured at the upper end thereof will clear the motor. Of course, since only one crank is necessary, there need be only one long sleeve 43, and the others may be in accordance with the shorter length sleeves 32 of FIGS. 1–3.

FIGURE 4 shows a further modification applicable to all sleeves, if so desired, which provides for ball-bearing support of the movable plate by the sleeve, and while shown in association with the long sleeve of FIG. 4, is equally applicable to any of said sleeves. According to the specific showing of this feature, a thrust bearing of conventional construction, designated in general by numeral 44, may be located on the sleeve beneath the plate, and is here illustrated as having an upper race 45 on which movable member or plate 36 rests around the margin of the sleeve-receiving hole 37, and provides a lower race 46 carried by the sleeve, balls or the like 47 being located between the races. An upwardly directed shoulder, provided by means of a peripheral groove 48 in the sleeve below the lower race 46, receives a snap ring 49 and between the snap ring and lower race 46 is a washer 50. The sleeve may consequently rotate freely, but the movable plate is retained against displacement in its axial relation to the sleeve. This provision of thrust bearings is optional on all of the sleeves, use thereof affording greater ease and rapidity of movement of the movable or upper plate.

While reference has been made hereinbefore to use of threaded posts proximate to the four corners of the plates, a stable construction can be provided with use of only three threaded posts in isosceles disposition as shown in FIGURE 6. Except for the number and disposition of the said posts, the structure could be in accordance with the foregoing description.

However, FIGS. 1–4 are also utilized to disclose further possible modification of the support structure, and in particular provide a device which is admirably suited for the type of drive where the motor shaft or the driven shaft is equipped with a spring-loaded variable-pitch pulley. In this type of drive, the displacement of the motor toward or away from the driven pulley effects changes in the radial location of that part of the periphery of the spring-loaded variable-pitch pulley which comes in contact with the belt, resulting in changes in speed of the driven pulley. The ease and rapidity with which the motor can be shifted to effect the changes in speed desired is very important in many applications. While carriages have been provided heretofore enabling a motor to move bodily in a direction parallel to the plane of its feet, the prior art is devoid of any satisfactory construction enabling a motor to be bodily moved, with parallelism of positions, in a direction perpendicular to the plane of its feet, and particularly under conditions of an imaginary line drawn between centers of the driving and driven shafts having angularity within the range of 45° to 90° to the plane of the motor feet.

In FIGURE 5, there is again shown a motor 20, with its driving shaft 21 and pulley 22 on which is belt 23 passing around a driven pulley 24 on a driven shaft 25 of an instrumentality 26 to which the rotative actuation from the motor is desired. In this illustration, an imaginary line from one shaft to the other makes an angle of approximately 45° with the plane of the motor feet 27. As in the previously described construction, the support provides a fixed basal member or plate 28 with appropriately located hollow bosses 29 made integral therewith, three of which, in this instance, are internally threaded and open upwardly to receive and retain the lower end portions of fixed threaded posts 30 secured against rotation therein by suitable means, such as adhesive of appropriate character. Also, as before, each threaded post 30 has an internally threaded sprocket wheel 31 thereon circumambient to which is an endless sprocket chain 41 constituting means for rotating all of the sprocket wheels simultaneously in the same direction and thereby shifting them equal distances longitudinally of the threaded posts.

Conforming to the heretofore explained arbitrary orientation, the front of the support will be considered as the side where the driving pulley 22 is located, so that now it may be said that two of the three threaded posts are located at the front, symmetrically at opposite sides of the motor, and that the third post is located at the rear-center of the basal member or plate axially in a vertical plane common to the motor axis. For convenience of description, this last-mentioned post will be referred to as the single post, whereas the two previously mentioned ones will be referred to as the pair of posts or front posts.

Projecting coaxially upwardly from the sprocket wheel 31 on said single post, shown more especially in detail in FIG. 9, is a compound sleeve 51 comprising a socket member 52 having internal screw threads meshing with external screw threads 53 on a nipple 54 whereby the length of said compound sleeve can be adjusted by screwing the nipple one way or the other with respect to the socket member 52. Both the nipple and socket member have internal diameters in excess of the major diameter of the threaded post, so as to be rotatable therearound. Said socket member 52 is made integral with the sprocket wheel, as by being welded thereto, and the nipple is retained in its adjusted position with respect to the socket member by suitable means, such as by a lock-nut 55 threaded on said nipple 54 and clamping against the upper end of the socket member 52. Above the threaded portion of nipple 54, is an external circumferential enlargement 56 the external periphery whereof is provided with wrench-receiving means, such as nut-like facets as explained with the corresponding construction previously described hereinabove.

The top edge of the nut-like enlargement 56 of nipple 54 provides a shoulder 33 which supports the lower race 46 of a thrust bearing 44, and which, through agency of the intervening balls 47 and overlying upper race 45 functions to receive the load applied by an upper or movable plate 36 corresponding to the description of FIGS. 1–4. In this instance, also, the plate 36 is kept seated on the thrust bearing by washer 38 around the upwardly protruding end of compound sleeve 51 and by an appropriate snap ring 39 above the washer. The compound sleeve may consequently rotate freely, but the movable plate 36 is retained against displacement in its relation axially of the sleeve. It will not be amiss to mention here that the socket member 52 of the sleeve 51 is also provided with external wrench-engaging means 57, which will not only be of assistance when screwing lock-nut 55 home, but will provide means for applying a rotative force to the sleeve and sprocket wheel with least likelihood of loosening the clamping effect of the lock-nut 55 against the end of the socket member 52.

The front pair of threaded posts provide for resilient support of the movable plate 36 from the respective sprocket wheels on those posts. According to the detail showing in FIGS. 7 and 8, a thrust bearing 58 is provided on the top of the sprocket wheel 31 and a compression spring 59 rests at its lower end on said bearing and extends upwardly, in surrounding relation to the post, to the under face of the movable top plate 36, thereby resiliently supporting said plate. A collar 60 is shown welded to the plate 36 surrounding the threaded post thereat, so as to provide an extended internal surface for obtaining sliding relation of the post through the hole 37 and preventing the plate from becoming lodged against the threads of the post.

In the use of the support of FIGS. 5–9, the motor 20 is secured in place on the movable or upper plate 36, and the plate is then leveled into parallelism to the lower fixed plate or basal member 28. If any cross-wise leveling of the upper plate between the pair of front posts is found necessary, the sprocket chain is disengaged and one sprocket wheel or the other is rotated until the movable plate is level from side to side. Leveling from front to rear is obtained by loosening the lock nut 55 on the sleeve on the single rear post, and then screwing the nipple 54 in proper direction to raise or lower the movable plate to level the same under its condition of use. Thereafter, raising or lowering of the movable plate 36 is obtained by rotation of all of the sprocket wheels simultaneously and in corresponding like directions through interconnection thereof by the sprocket chain, and notwithstanding such adjustment, said movable plate maintains its relation of parallelism from one position to another.

It is to be observed that the construction shown and described with FIGURES 5–9 contemplates a situation wherein the instrumentality is located at a level below the support of the present invention. However, if the instrumentality is located at a level above the support, the construction will have an arrangement illustrated in FIGURES 10–14. Repetition of the description of the single post and its associated elements is not deemed necessary, and the same reference numerals as heretofore used are again applied to tie in with the preceding non-repeated description. The only difference lies in the fact that the thrust bearing 58 is here located above the movable plate 36 instead of beneath it. The rear of the motor is proximate to this single post in this showing just as in the previously described showing. The pulley-end of the motor is proximate to the edge of the movable plate, again arbitrarily referred to as the front, proximate to the pair of threaded posts.

In the showing of FIGURES 10–14, wherein upward thrust by the driving belt 23 is involved, the sleeve 61 fixed on each of the sprocket wheels 31 of the front two posts of the pair of posts is long enough to project well above the movable plate 36 to receive the spiral spring 59 around the respective sleeve, with each spring bearing at its lower end against the top of the said plate, and bearing at its upper end against a thrust bearing 58 proximate to the top of the sleeve and held from displacement by an overlying washer 38 and snap ring 39. Downward displacement of the plate with respect to the sleeve is prevented by a washer 50 and snap ring 49 thereunder substantially as provided and described in connection with the showing in FIG. 4, but without need of a thrust bearing below the plate.

In all instances, the threaded posts are made of appropriate length to accommodate the sleeves and to afford the desired amount of longitudinal movement of the respective sleeve on each of said posts. If so desired, and especially with the three-post arrangements, stabilizing smooth surface posts 62 may be provided parallel to and offset laterally from the threaded posts. These stabilizing posts are fixed in bosses 63 welded or otherwise made integral with the basal member or lower plate. Said stabilizing posts project upwardly through the upper or movable plate which is provided with guiding collars 64 fixed thereon, said collars having sliding fit with said stabilizing posts. These stabilizing posts will not only assist in guiding the upper plate during shifting thereof under influence of the rotation of the sprocket wheels, but will absorb at least a part of the torque or twisting force existent as a consequence of pull exerted by the driving belt in use.

Furthermore, in all forms of the invention, the condition prevails of a driving and a driven shaft parallel to each other being located in a common plane with said plane making an angle in the range of 45° to 90° with the plane of the motor feet, and this condition exists whether the lower or basal plate against which the feet are secured is mounted in any of the conventional mounting positions, namely, mounting on a floor or bench, or mounting the other side up as on a ceiling, or mounting side-wise as on a side wall, or otherwise, and with the motor shaft horizontal, vertical or otherwise.

I claim:

1. A support of the character described, comprising a basal member, a movable member associated therewith and providing a planar surface adapted to have a motor mounted thereon, a plurality of threaded posts interposed between said members, means on each of said posts having threaded engagement with the respective post and sustaining the movable member from the basal member and thereby providing for movement of the movable member toward and away from the basal member in a direction of movement perpendicular to said planar surface of the movable member, at least one of said means being constituted as a compound sleeve comprising a socket member and a nipple having interengaging screw threads for adjusting the length of said compound sleeve, and an interconnection between said means on said plurality of posts operating the several said means simultaneously and maintaining parallelism of successive positions of said planar surface of the movable member.

2. A support in accordance with claim 1, wherein each of said means comprises a sprocket wheel and said interconnection comprises an endless sprocket chain circumambient to all of said sprocket wheels, and wherein said socket member is coaxial with and fixed on its respective sprocket wheel, and a lock nut having threaded engagement on the screw threads of said nipple and adapted to lock against an end of said socket member.

3. A support in accordance with claim 1, wherein said nipple projects between said socket member and its respective post and has an internal diameter at least as great as the major diameter of the post threads whereby said nipple is rotatable outside of the post threads and longitudinally movable along the post and over said threads.

References Cited by the Examiner

UNITED STATES PATENTS

| 1,482,370 | 1/1924 | Spilger | 248—23 |
| 2,377,563 | 6/1945 | Lunenberger et al. | 248—23 |
| 3,130,077 | 4/1964 | Burden | 248—23 X |

FOREIGN PATENTS 650,775  10/1928  France.

CLAUDE A. LE ROY, *Primary Examiner.*

FRANK L. ABBOTT, *Examiner.*

J. PETO, *Assistant Examiner.*